US012467316B1

(12) United States Patent
Vernon

(10) Patent No.: US 12,467,316 B1
(45) Date of Patent: Nov. 11, 2025

(54) LADDER SAFETY DEVICE

(71) Applicant: Calvin Vernon, Mesa, AZ (US)

(72) Inventor: Calvin Vernon, Mesa, AZ (US)

( * ) Notice: Subject to any disclaimer, the term of this patent is extended or adjusted under 35 U.S.C. 154(b) by 649 days.

(21) Appl. No.: 17/895,006

(22) Filed: Aug. 24, 2022

(51) Int. Cl.
*E06C 7/00* (2006.01)
*B25H 3/06* (2006.01)
*E06C 7/04* (2006.01)
*E06C 7/14* (2006.01)

(52) U.S. Cl.
CPC ............... *E06C 7/006* (2013.01); *B25H 3/06* (2013.01); *E06C 7/14* (2013.01); *E06C 7/003* (2013.01)

(58) Field of Classification Search
CPC . E06C 7/006; E06C 7/14; E06C 7/003; B25H 3/06
USPC ........................................ 182/106, 107, 129
See application file for complete search history.

(56) References Cited

U.S. PATENT DOCUMENTS 4,261,435 A 4/1981 Winter
4,383,669 A * 5/1983 Rasler ..................... E06C 7/14 248/912
4,653,713 A 3/1987 Hamilton
5,333,823 A * 8/1994 Joseph ..................... E06C 7/14 248/210
5,421,428 A 6/1995 Ingles
5,505,302 A * 4/1996 Ferley ..................... B25H 3/02 248/210
5,782,314 A * 7/1998 Zeitler ..................... E06C 7/14 248/210
5,901,998 A * 5/1999 Gallo, Jr. ................. E06C 7/14 294/146
D410,551 S * 6/1999 Guimont ..................... D25/68
5,913,380 A * 6/1999 Gugel ..................... E06C 7/14 248/210
5,941,344 A * 8/1999 Spadaro ................... E06C 7/14 248/210
5,950,972 A * 9/1999 Irish ......................... E06C 7/14 248/210
6,364,057 B1 * 4/2002 Cornejo ................. E06C 7/006 248/210
6,443,260 B1 * 9/2002 Katz ......................... E06C 7/14 248/238
7,032,711 B1 * 4/2006 Katz ......................... B25H 3/06 248/238
7,156,205 B2 * 1/2007 Wilson ..................... E06C 1/39 182/129
7,264,084 B1 * 9/2007 Switzer ................... E06C 7/14 248/238
7,503,454 B2 * 3/2009 Gorman ................... B25H 3/06 206/349

(Continued)

*Primary Examiner* — Robert Canfield
(74) *Attorney, Agent, or Firm* — Cramer Patent & Design; Aaron R. Cramer

(57) ABSTRACT

The ladder safety device may comprise a top cap cover and a top step guard. The ladder safety device may be a safety device configured for use on a step ladder. The top cap cover may be operable to cover a top cap of the step ladder and may be adapted to prevent a worker from stepping onto the top cap. The top step guard may be operable to block access to a top step of the step ladder and may be adapted to prevent the worker from stepping onto the top step. The top cap cover may be configured to hold tools and supplies. The top cap cover and the top step guard may be retained on the step ladder by a plurality of straps.

2 Claims, 7 Drawing Sheets

(56) References Cited

U.S. PATENT DOCUMENTS

| | | | | |
|---|---|---|---|---|
| 8,151,938 | B2 * | 4/2012 | Kinskey | A45C 5/00 206/349 |
| 8,616,334 | B2 * | 12/2013 | Allred | E06C 7/18 182/129 |
| 8,636,144 | B1 * | 1/2014 | Lawery | E06C 7/14 220/570 |
| 9,359,819 | B1 * | 6/2016 | Valadez | E06C 7/14 |
| 10,633,918 | B2 * | 4/2020 | Wulfekotte | E06C 1/20 |
| 10,808,458 | B1 * | 10/2020 | Franklin | E06C 7/006 |
| 11,053,738 | B1 | 7/2021 | Blake | |
| D1,079,060 | S * | 6/2025 | Vernon | D25/68 |
| 2002/0070136 | A1 * | 6/2002 | Hedges | E06C 7/14 224/901.2 |
| 2002/0153202 | A1 * | 10/2002 | Sawicki | E06C 7/14 182/129 |
| 2003/0015371 | A1 * | 1/2003 | Coore | E06C 7/006 182/129 |
| 2005/0150723 | A1 * | 7/2005 | Wilson | E06C 1/39 182/129 |
| 2005/0258002 | A1 * | 11/2005 | Sabo | E06C 7/14 182/129 |
| 2009/0114479 | A1 * | 5/2009 | Tate | E06C 7/006 182/230 |
| 2010/0018801 | A1 * | 1/2010 | Allred | E06C 1/39 182/129 |
| 2011/0168493 | A1 * | 7/2011 | Clark | E06C 7/14 182/129 |
| 2012/0228058 | A1 * | 9/2012 | Dubois | E06C 7/006 182/129 |
| 2012/0298448 | A1 * | 11/2012 | Houdyshell | E06C 1/18 182/106 |
| 2017/0058602 | A1 * | 3/2017 | Cureton | E06C 7/14 |
| 2019/0271191 | A1 * | 9/2019 | Crowell | E06C 7/003 |
| 2021/0131182 | A1 * | 5/2021 | Slate | B25H 3/06 |
| 2022/0025705 | A1 * | 1/2022 | Mislich | E06C 7/006 |
| 2023/0114193 | A1 * | 4/2023 | Waddell | E06C 7/14 182/129 |

* cited by examiner

LADDER SAFETY DEVICE

RELATED APPLICATIONS

None

FIELD OF THE INVENTION

The present invention relates generally to a safety device and more specifically to a safety device for a ladder.

BACKGROUND OF THE INVENTION

There is a seemingly endless list of activities performed at home, work, and in m any other environments that require the use of a step ladder, or "A"-frame ladder, in order to allow its user to gain access to areas that otherwise would be inaccessible. During their use, many users will actually climb on to the very top step of the ladder to reach the desired work area. Not only does this place the user's safety in peril, but it is also actually against various workplace safety regulations, which can result in costly fines.

While most workers have been trained and are aware of such regulations, the desire to complete a task, forces many to use the top step while thinking they can get away with it just this one time. Additionally, such step ladders do not provide a work area or storage area on the ladder for tools or supplies, thus forcing the worker to hold them in their hands or pockets while climbing the ladder. Then, the situation inevitably arises where the required tool, supply item or material is not on hand and, as a result, time and money are wasted in climbing back down the ladder, tracking the item down and then climbing back up the ladder. Accordingly, there is a need for a means by which users of stepladders can be incentivized to avoid standing on the top step of a stepladder while also being provided a means to hold tools, materials, and supplies in a readily accessible state. The development of the ladder safety device is such a solution.

SUMMARY OF THE INVENTION

The principles of the present invention provide for a ladder safety device having a top cap cover which is adapted to cover a top cap of a step ladder. The top cap cover includes a rear wall, a front wall, a cap wall, a gradient wall, and a top wall. The ladder safety device also has a top step guard adapted to block access to the top step of the step ladder.

The top cap cover may be configured to hold a plurality of tools and supplies. The top wall may include a plurality of material holders configured to hold the tools and the supplies at the top of the step ladder. The material holders may include a paint can holder with a vertically oriented well that passes through the top wall. The top cap cover and the top step guard may be retained on the step ladder by a plurality of straps.

A bottom of the rear wall may include a plurality of rear apertures such that a first subset of the straps couple to the bottom of the rear wall. A bottom of the front wall may include a plurality of front apertures such that the first subset of the straps coupled to the rear wall couple to the bottom of the front wall after passing under the top cap. The first subset of the straps may be coupled to the rear wall and to the front wall retain the top cap cover on the top cap. The top cap cover may couple to the top cap of the step ladder to prevent use of the top cap as a step.

The rear wall may be a vertically oriented panel located at the rear of the top cap cover. A bottom of the rear wall may include a rear hook. The rear hook may curve towards a front of the step ladder and upwards such that the rear hook grasps the bottom rear edge of the top cap. The front wall may be a vertically oriented panel located at the front of the top cap cover. The front wall may be shorter in height than the rear wall. The cap wall is a horizontally oriented panel located at the bottom of the top cap cover. A cap wall may rest upon the top cap when the top cap cover is in place on the step ladder.

The rear edge of the cap wall may be coupled to the rear wall on the bottom half of the rear wall the front edge of the cap wall couple to the top edge of the gradient wall. The gradient wall may couple the cap wall to the front wall and is oriented at an angle such that the gradient wall matches the slope of the front of the top cap. The ladder safety device may also comprise one or more nested rings fit into the bottom of the paint can holder to change the diameter of the bottom of the paint can holder such that the paint can holder holds a plurality of containers of different sizes. The top step guard may include a guard retention hook that project rearwards and then upwards from the rear of the step blocking panel and detachably couple to a bottom of a top step such that the step blocking panel is retained on the top step while the top step guard is pulled upwards.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
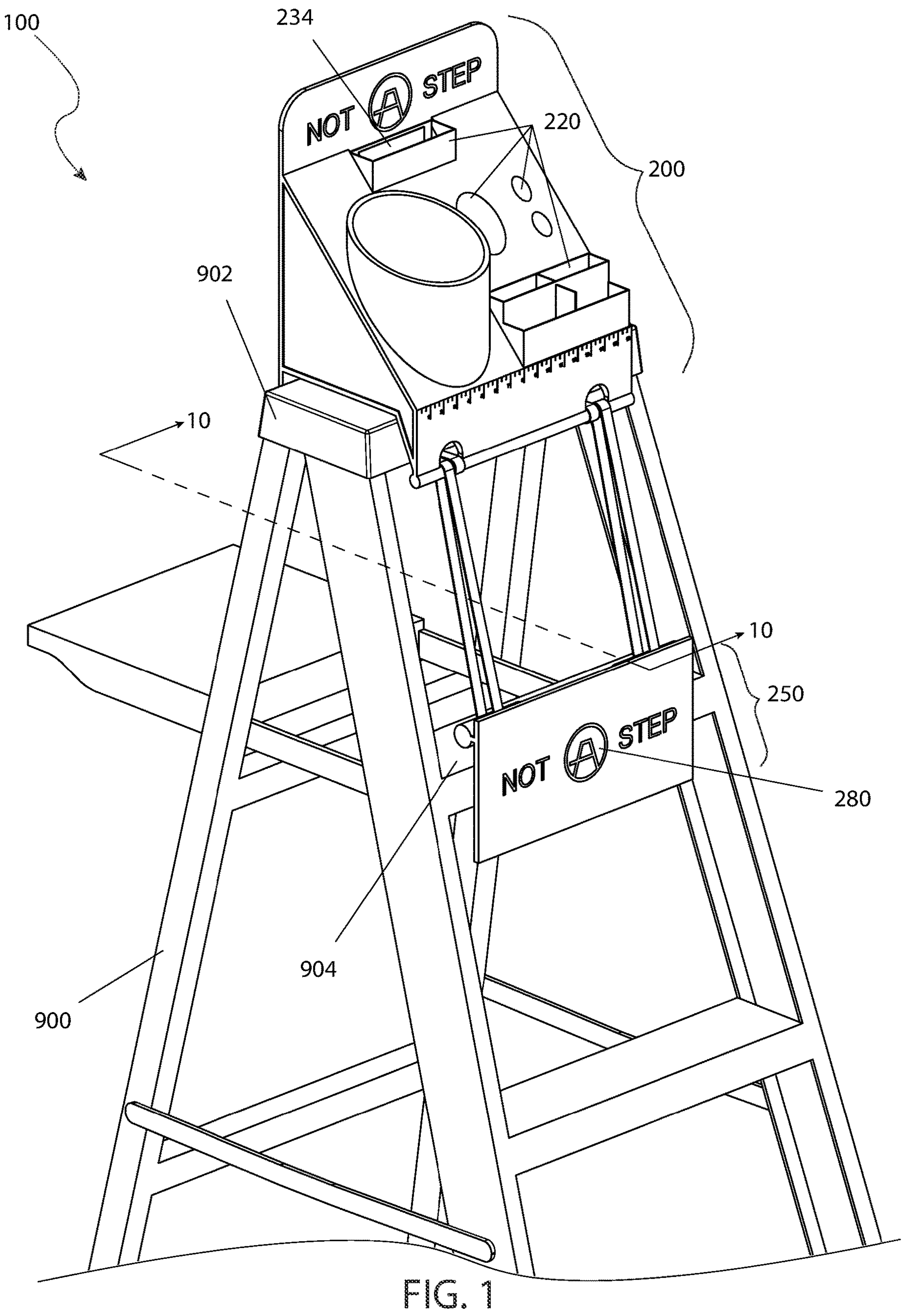
FIG. 1 is an in-use view of a ladder safety device, according to an embodiment of the present invention.
Figure 3:
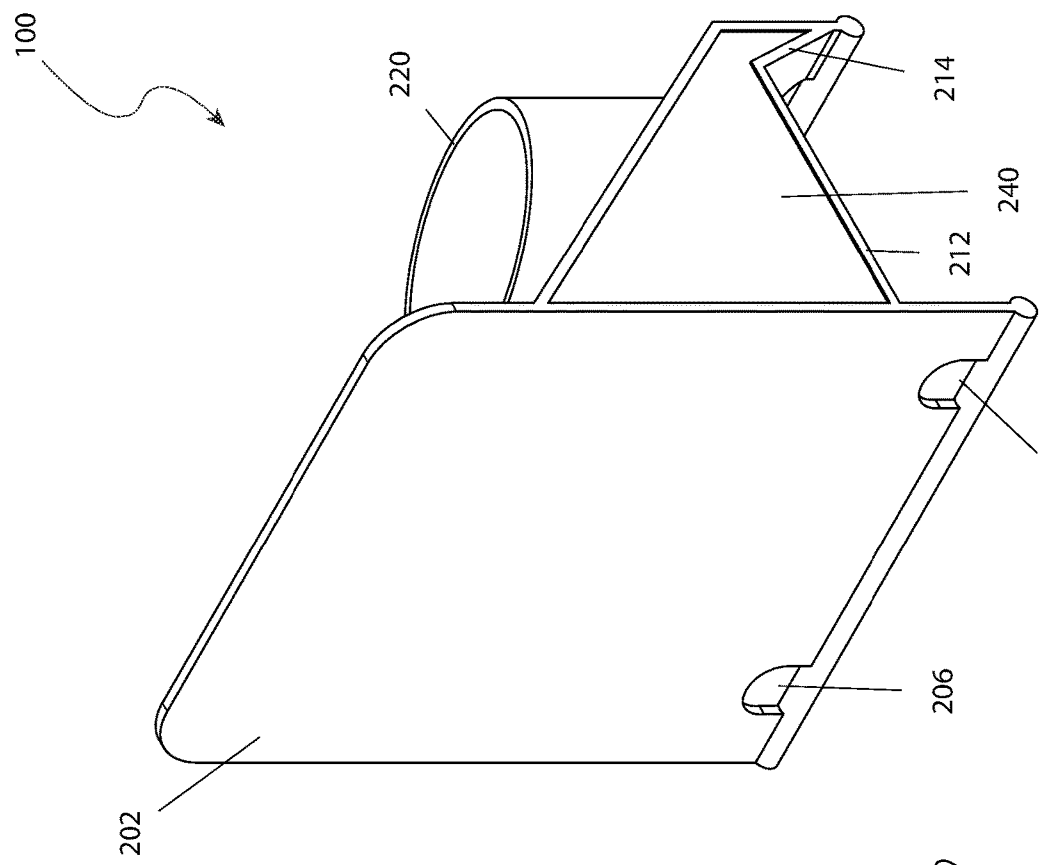
FIG. 3 is an isometric rear view of a ladder safety device, according to an embodiment of the present invention, illustrating the top cap cover.
Figure 2:
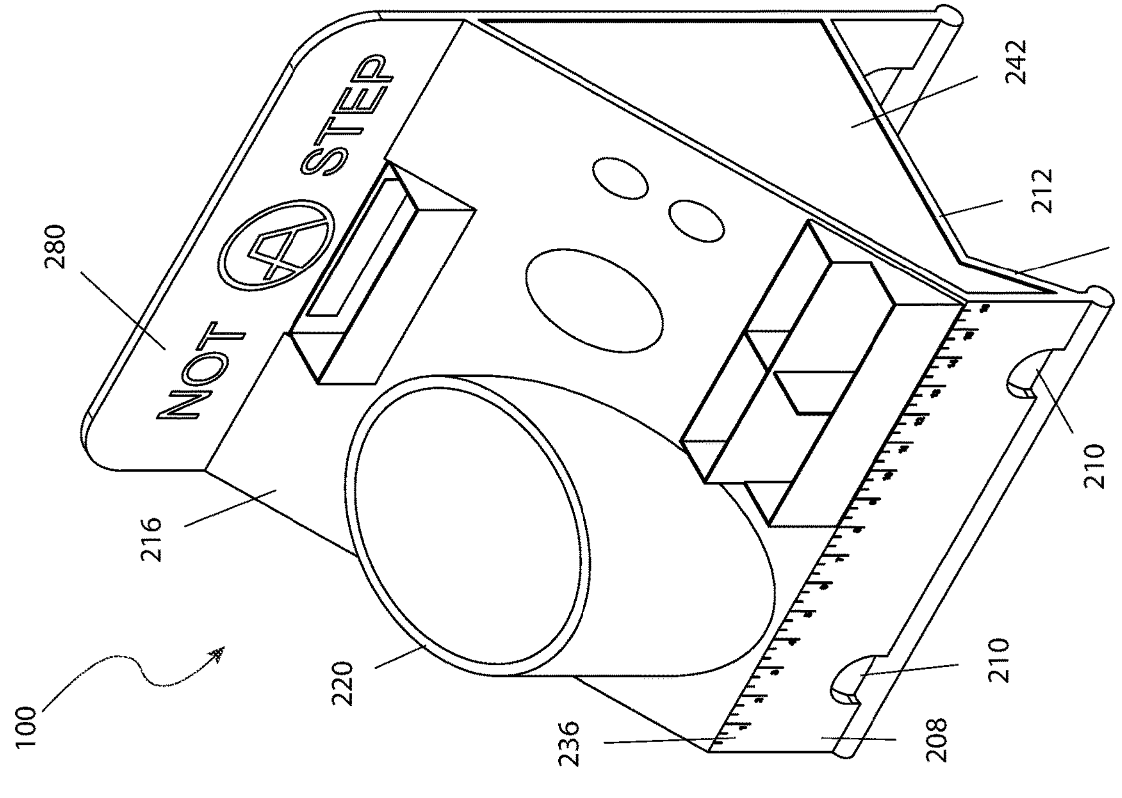
FIG. 2 is an isometric front view of a ladder safety device, according to an embodiment of the present invention.
Figure 4:
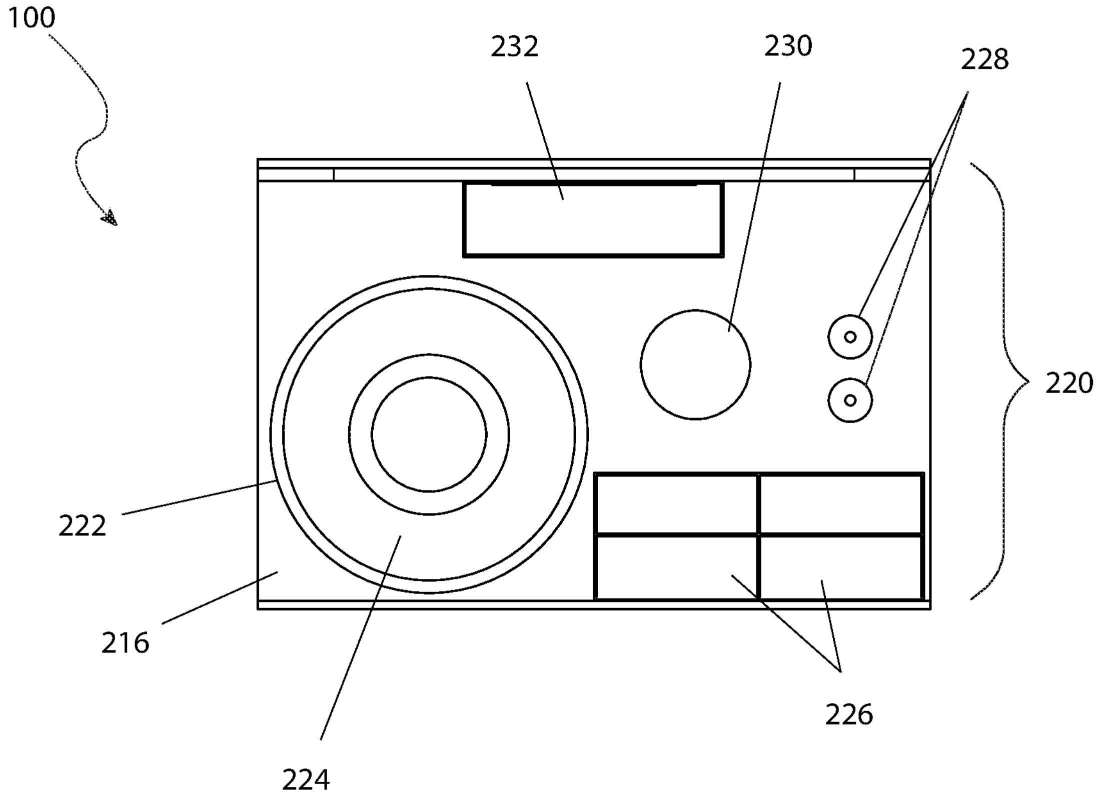
FIG. 4 is a top view of a ladder safety device, according to an embodiment of the present invention, illustrating the top cap cover.
Figure 5:
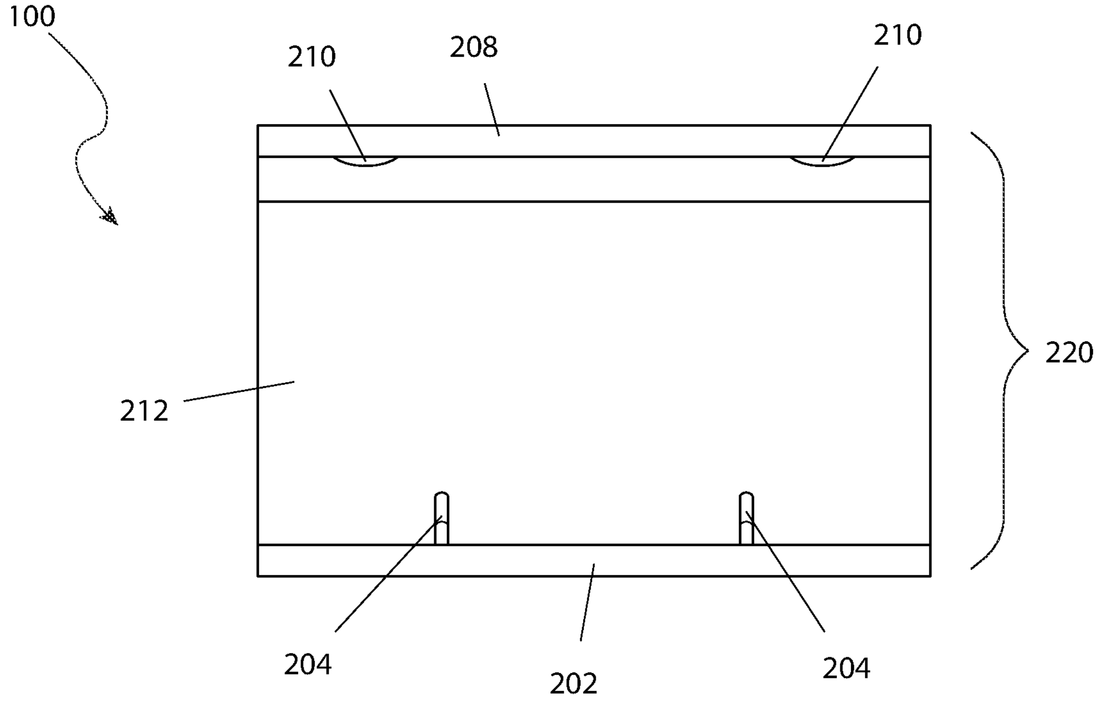
FIG. 5 is a bottom view of a ladder safety device, according to an embodiment of the present invention, illustrating the top cap cover.
Figure 6:
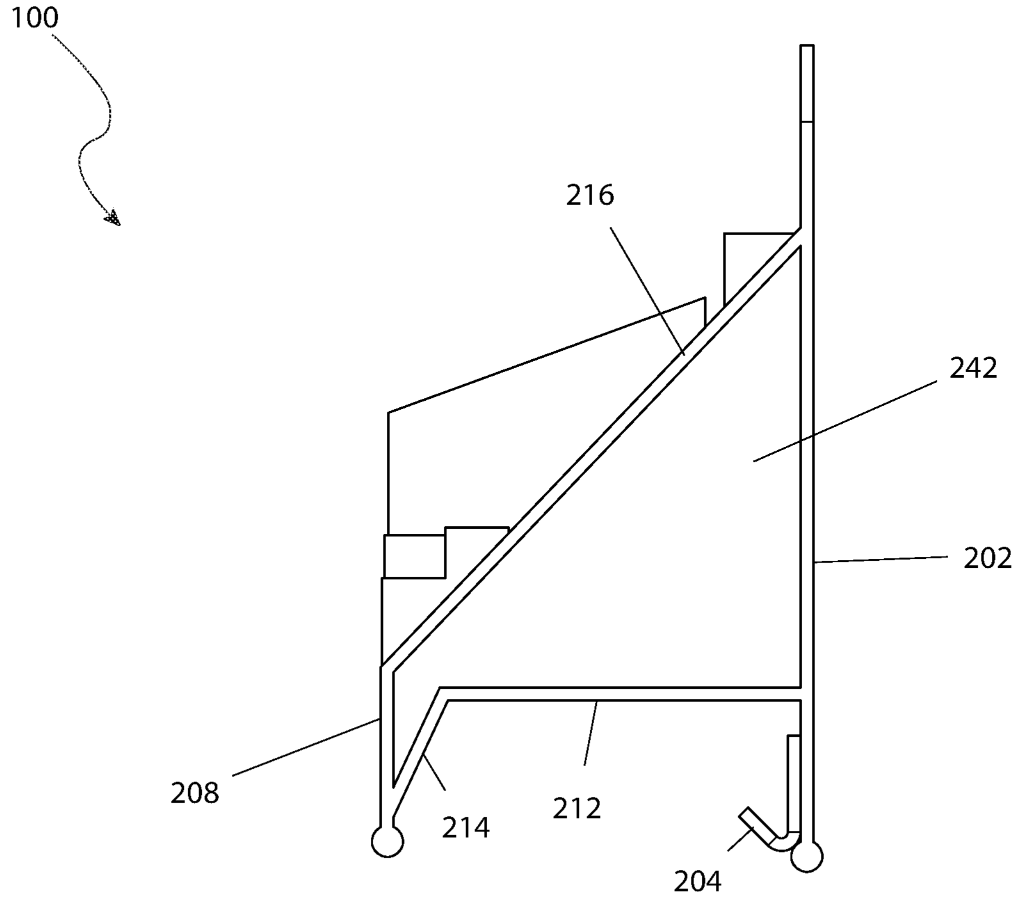
FIG. 6 is a side view of a ladder safety device, according to an embodiment of the present invention, illustrating the top cap cover.
Figure 7:
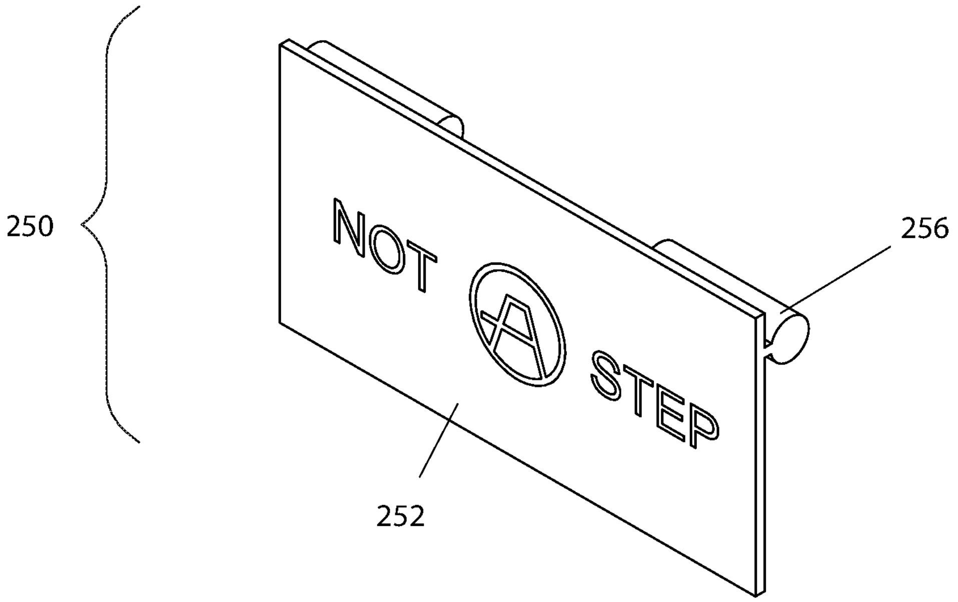
FIG. 7 is an isometric front view of a ladder safety device, according to an embodiment of the present invention, illustrating the top step guard.
Figure 8:
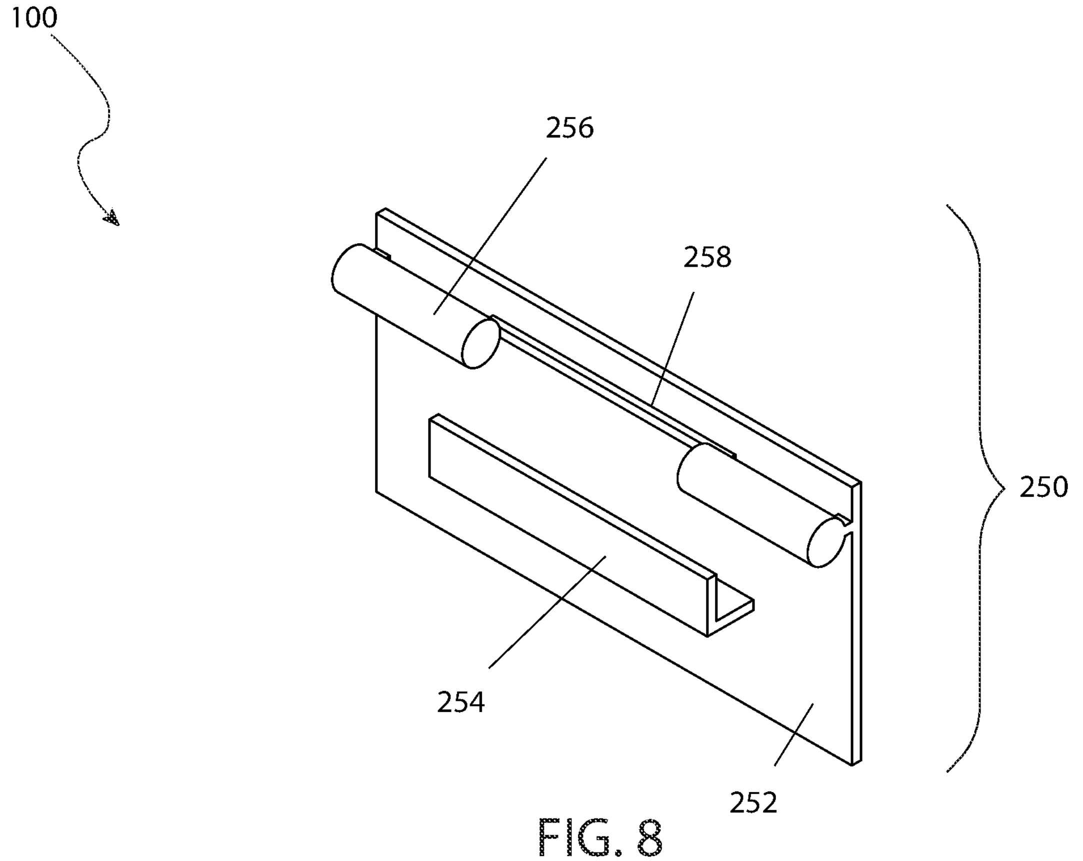
FIG. 8 is an isometric rear view of a ladder safety device, according to an embodiment of the present invention, illustrating the top step guard.
Figure 9:
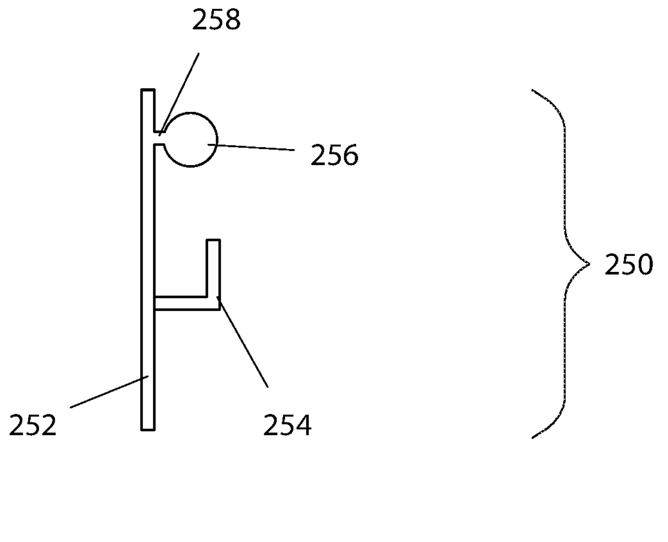
FIG. 9 is a side view of a ladder safety device, according to an embodiment of the present invention, illustrating the top step guard.
Figure 10:
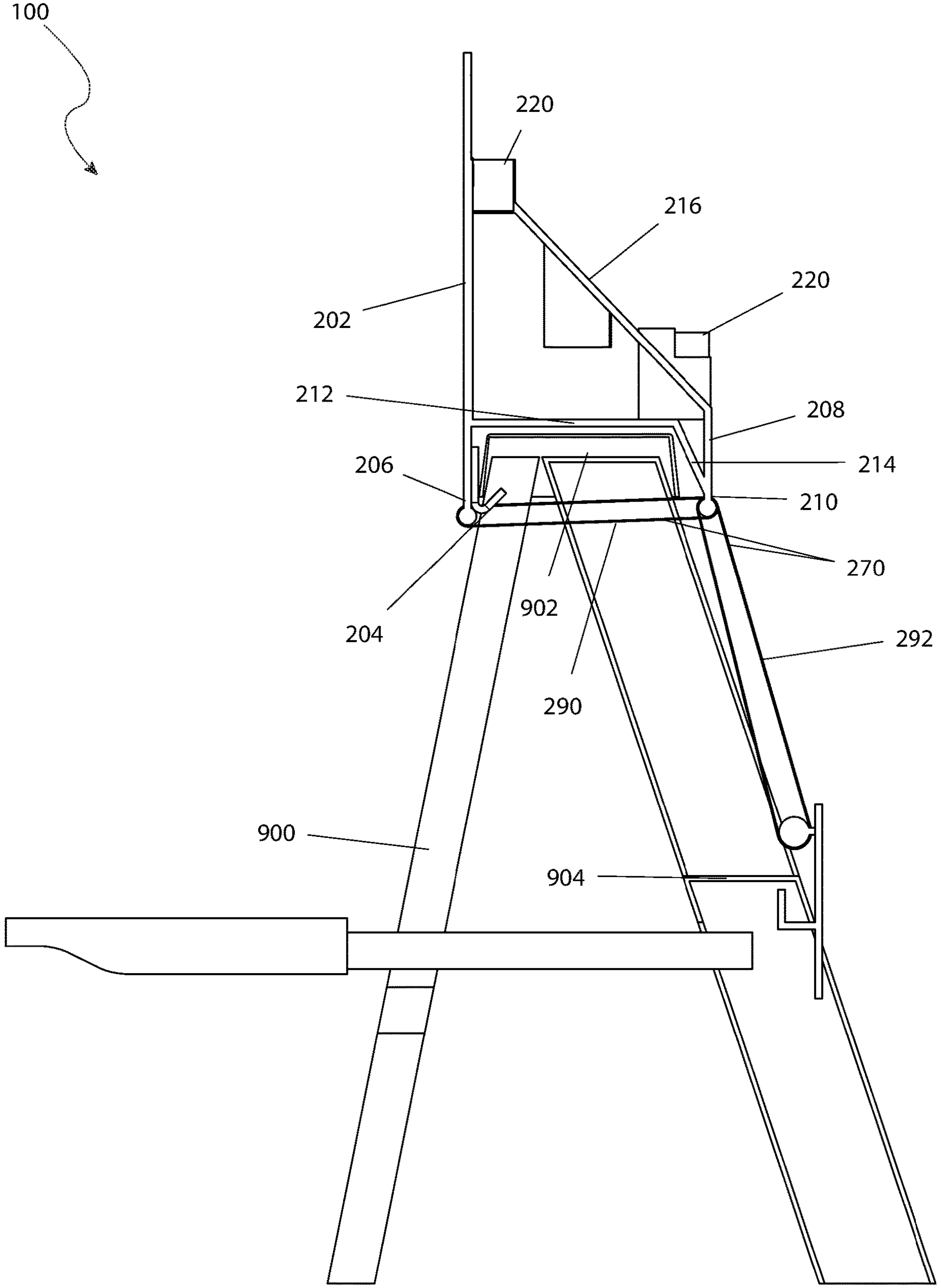
FIG. 10 is a cross-sectional view of a ladder safety device, according to an embodiment of the present invention, across Line 10-10 as shown in FIG. 1.
Figure 11:
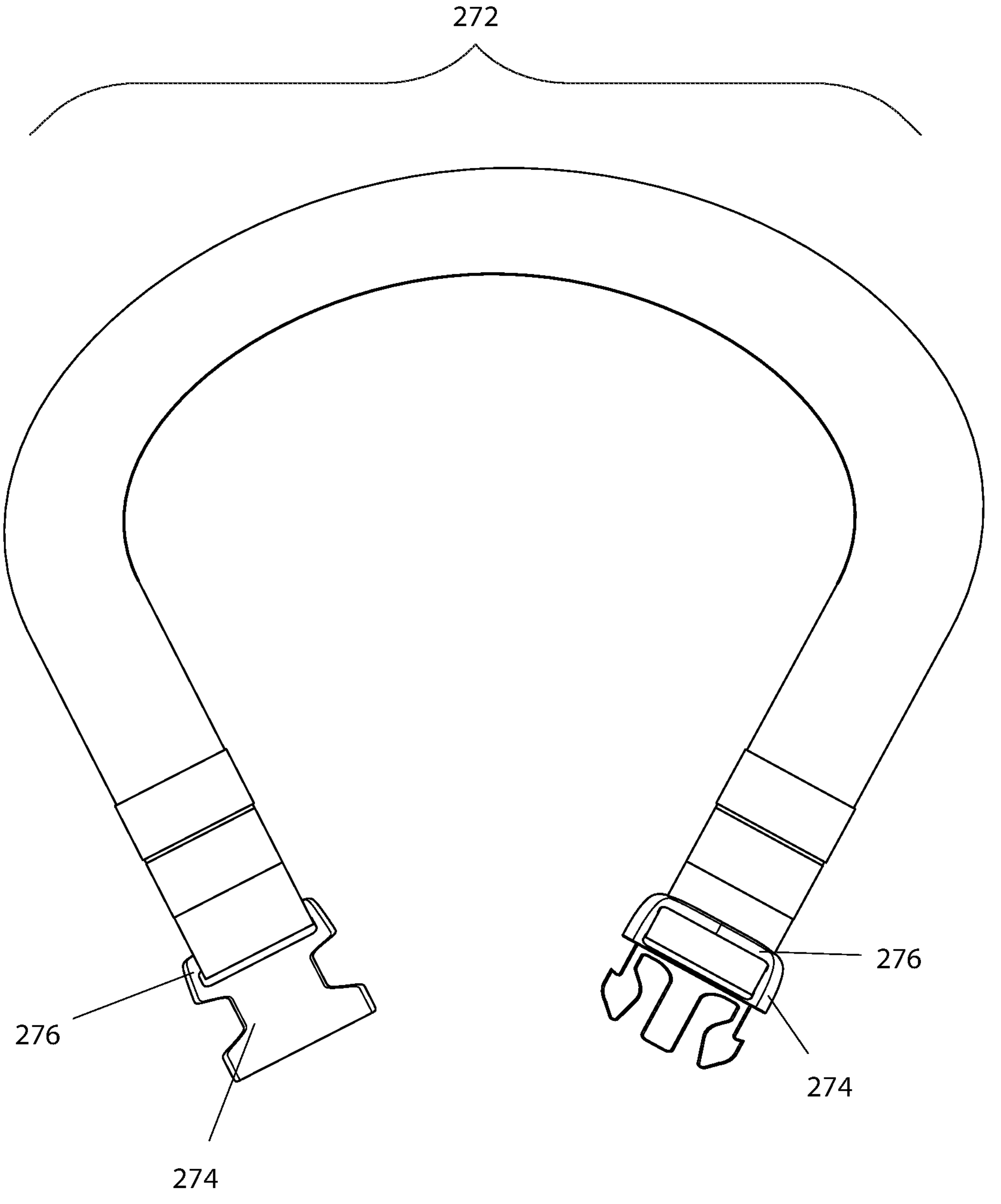
FIG. 11 is a detail view of a ladder safety device, according to an embodiment of the present invention, illustrating an individual strap.

100 ladder safety device
200 top cap cover

202 rear wall
204 rear hook
206 rear aperture
208 front wall
210 front aperture
212 cap wall
214 gradient wall
216 top wall
220 material holder
222 paint can holder
224 nested ring
226 hand tool pocket
228 screwdriver holder
230 tool chuck holder
232 parts holder
234 magnetic retention
236 measuring tape
240 left side wall
242 right side wall
250 top step guard
252 step blocking panel
254 guard retention hook
256 guard attachment rod
258 interposer
270 plurality of straps
272 individual strap
274 buckle
276 length adjuster
280 warning message
290 first subset
292 second subset
900 step ladder
902 top cap
904 top step

1. DESCRIPTION OF THE INVENTION

The present invention is directed to a ladder safety device (herein described as the "invention") 100. The invention 100 may comprise a top cap cover 200 and a top step guard 250. The invention 100 may be a safety device configured for use on a step ladder 900. The top cap cover 200 may be operable to cover a top cap 902 of the step ladder 900 and may be adapted to prevent a worker from stepping onto the top cap 902. The top step guard 250 may be operable to block access to a top step 904 of the step ladder 900 and may be adapted to prevent the worker from stepping onto the top step 904. The top cap cover 200 may be configured to hold tools and supplies. The top cap cover 200 and the top step guard 250 may be retained on the step ladder 900 by a plurality of straps 270.

The top cap cover 200 may comprise a rear wall 202, a front wall 208, a cap wall 212, a gradient wall 214, and a top wall 216. The top cap cover 200 may couple to the top cap 902 of the step ladder 900 to prevent the use of the top cap 902 as a step. The rear wall 202 may be a vertically oriented panel located at the rear of the top cap cover 200. The bottom of the rear wall 202 may comprise a rear hook 204. The rear hook 204 may curve towards the front of the step ladder 900 and upwards such that the rear hook 204 may grasp the bottom rear edge of the top cap 902. The bottom of the rear wall 202 may comprise a plurality of rear apertures 206 such that a first subset 290 of the plurality of straps 270 may couple to the bottom of the rear wall 202.

The front wall 208 may be a vertically oriented panel located at the front of the top cap cover 200. The front wall 208 may be shorter in height than the rear wall 202. The bottom of the front wall 208 may comprise a plurality of front apertures 210 such that the first subset 290 of the plurality of straps 270 coupled to the rear wall 202 may couple to the bottom of the front wall 208 after passing under the top cap 902. The first subset 290 of the plurality of straps 270 coupled to the rear wall 202 and to the front wall 208 may retain the top cap cover 200 on the top cap 902.

The cap wall 212 may be a horizontally oriented panel located at the bottom of the top cap cover 200. The cap wall 212 may rest upon the top cap 902 when the top cap cover 200 is in place on the step ladder 900. The rear edge of the cap wall 212 may be coupled to the rear wall 202 on the bottom half of the rear wall 202. The front edge of the cap wall 212 may couple to the top edge of the gradient wall 214.

The gradient wall 214 may couple the cap wall 212 to the front wall 208 and may be oriented at an angle such that the gradient wall 214 matches the slope of the front of the top cap 902. The bottom of the gradient wall 214 may be coupled to the bottom of the front wall 208.

The top wall 216 may couple the top of the front wall 208 to the upper half of the rear wall 202. The top wall 216 may be inclined such that the top wall 216 is not suitable as a step.

In some embodiments, the top cap cover 200 may comprise a left side wall 240 and a right side wall 242 to cover the left and right sides of the top cap cover 200.

The top wall 216 may comprise a plurality of material holders 220. The plurality of material holders 220 may be configured to hold the tools and the supplies at the top of the step ladder 900.

The plurality of material holders 220 may comprise a paint can holder 222. The paint can holder 222 may be a vertically oriented well that passes through the top wall 216. The paint can holder 222 may be sized to hold a quart paint can. The paint can holder 222 may comprise one (1) or more nested rings 224 that fit into the bottom of the paint can holder 222. The paint can holder 222 may be inserted into and removed from the paint can holder 222. The nested rings 224 may be operable to change the diameter of the bottom of the paint can holder 222 such that the paint can holder 222 may hold containers of different sizes. As a non-limiting example, a combination of the nested rings 224 may configure the paint can holder 222 to hold a beverage container.

The plurality of material holders 220 may comprise one (1) or more hand tool pockets 226. The hand tool pockets 226 may be configured to hold one (1) or more hand tools. As non-limiting examples, the one hand tool pockets 226 may hold pliers, wrenches, utilities knives, flashlights, and clamps.

The plurality of material holders 220 may comprise one (1) or more screwdriver holders 228. Each of the screwdriver holders 228 may comprise a vertically oriented aperture and may be operable to hold screwdrivers in a vertical orientation.

The plurality of material holders 220 may comprise one (1) or more tool chuck holders 230. Each of the tool chuck holders 230 may be a vertically oriented well sized to hold a tool chuck and comprising a central aperture. Drills may be held in the tool chuck holders 230 by placing the tool chucks of the drills into the tool chuck holders 230 with the drill bit extending down through the central aperture.

The plurality of material holders 220 may comprise one (1) or more parts holders 232. The parts holders 232 may be bins for holding components such as nuts, bolts, screws, nails, hooks, and hinges.

Any or all of the plurality of material holders 220 may comprise a magnetic retention 234. The plurality of material holders 220 with the magnetic retention 234 may comprise a magnet within the plurality of material holders 220 to attract metallic items and may reduce the likelihood of the metallic items being dropped.

The top cap cover 200 may comprise a measuring tape 236 located on the front wall 208. The measuring tape 236 may be a ruled strip coupled to the front surface of the front wall 208. The measuring tape 236 may be operable to measure a dimension of an item held against the measuring tape 236.

The top step guard 250 may cover the top step 904 and may be adapted to prevent the worker from using the top step 904. The top step guard 250 may comprise a step blocking panel 252. The step blocking panel 252 may be a rectangular panel that may be suspended in front of the step ladder 900 such that the step blocking panel 252 blocks access to the top step 904.

The top step guard 250 may comprise a guard retention hook 254. The guard retention hook 254 may project rearwards and then upwards from the rear of the step blocking panel 252. The guard retention hook 254 may detachably couple to the bottom of the top step 904 such that the step blocking panel 252 is retained on the top step 904 while the top step guard 250 is pulled upwards. A guard attachment rod 256 may be a cylindrical rod that is located on the rear side of the step blocking panel 252. The guard attachment rod 256 may be laterally oriented. The guard attachment rod 256 may be separated from the step blocking panel 252 by an interposer 258. The top step guard 250 may be pulled upwards by a second subset 292 of the plurality of straps 270. The second subset 292 of the plurality of straps 270 may loop around the guard attachment rod 256 and may pass through the plurality of front apertures 210 of the top cap cover 200.

The plurality of straps 270 may be operable to retain the top cap cover 200 and/or the top step guard 250 on the step ladder 900. An individual strap 272 selected from the plurality of straps 270 may comprise a fastener such that the individual strap 272 may be coupled to form a loop and decoupled to open the loop. As a non-limiting example, the fastener may be a buckle 274. In some embodiments, the individual strap 272 may comprise a length adjuster 276 to tighten and loosen the individual strap 272. In some embodiments, the individual strap 272 may be made of an elastic material such that the individual strap 272 may tighten the coupling where the individual strap 272 is used.

The top cap cover 200, the top step guard 250, or both may comprise one (1) or more warning messages 280. The warning messages 280 may display text, graphics, or both which indicate that the use either the top cap 902 or the top step 904 as a step is unsafe.

In use, the top cap cover 200 may be placed on the top cap 902 of the step ladder 900 by hooking the rear hook 204 under the rear of the top cap 902, lowering the top cap cover 200 such that the cap wall 212 rests on top of the top cap 902, and coupling the first subset 290 of the plurality of straps 270 between the plurality of rear apertures 206 and the plurality of front apertures 210 along a path that is under the top cap 902. The top step guard 250 may be coupled to the front of the step ladder 900 to block access to the top step 904 by hooking the guard retention hook 254 under the front of the top step 904, pulling up on the top step guard 250, and coupling the second subset 292 of the plurality of straps 270 between the guard attachment rod 256 on the top step guard 250 and the plurality of front apertures 210 on the top cap cover 200. Tools and supplies may be placed into the plurality of material holders 220 on the top cap cover 200 for accessibility while working from the step ladder 900.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An integrated ladder safety device, comprising:

a top cap cover adapted to cover a top cap of a step ladder, the top cap cover including a rear wall, a front wall, a cap wall, a gradient wall, and a top wall, the top wall being inclined such that the top wall is not suitable as a step;

a plurality of material holders coupled to the top wall and configured to hold tools and supplies; and a top step guard directly coupled to the top cap cover, the top step guard including a step blocking panel configured to cover a top step of the step ladder and prevent access to the top step; and, wherein the top cap cover further comprises left and right side walls to cover lateral sides of the top cap cover; and wherein at least one of the plurality of material holders comprises a magnetic retention feature to attract metallic items.

2. The ladder safety device of claim 1, wherein the plurality of material holders comprise one or more hand tool pockets, screwdriver holders, tool chuck holders, or parts holders, and wherein the front wall includes a measuring tape configured to measure a dimension of an item, and wherein at least one of the top cap cover or the top step guard comprises a warning message comprising text, graphics, or both indicating that use of the top cap or the top step as a step is unsafe.

* * * * *